United States Patent
Wu et al.

[11] Patent Number: 6,124,516
[45] Date of Patent: Sep. 26, 2000

[54] CATALYST COMPOSITION AND PROCESSES THEREFOR AND THEREWITH

[75] Inventors: An-hsiang Wu, Bartlesville; Charles A. Drake, Nowata, both of Okla.

[73] Assignee: Phillips Petroleum Company, Bartlesville, Okla.

[21] Appl. No.: 09/235,071

[22] Filed: Jan. 21, 1999

[51] Int. Cl.$^7$ .............................. C10G 35/06; C07C 5/13
[52] U.S. Cl. .................. 585/737; 585/734; 585/739; 208/136; 208/137
[58] Field of Search .................................. 208/136, 137; 585/734, 737, 739

[56] References Cited

U.S. PATENT DOCUMENTS

| | | | |
|---|---|---|---|
| 4,532,226 | 7/1985 | Chu | 502/71 |
| 4,827,076 | 5/1989 | Kokayeff et al. | 585/737 |
| 5,176,817 | 1/1993 | Skeels et al. | 208/111 |
| 5,233,121 | 8/1993 | Modica | 585/739 |
| 5,338,716 | 8/1994 | Triplett et al. | 502/64 |
| 5,384,027 | 1/1995 | Sherif | 208/134 |
| 5,576,466 | 11/1996 | Ledoux et al. | 585/735 |
| 5,689,027 | 11/1997 | Abichandani et al. | 585/481 |

*Primary Examiner*—Walter D. Griffin
*Assistant Examiner*—Tam M. Nguyen
*Attorney, Agent, or Firm*—Reece A. Scott

[57] ABSTRACT

A process for isomerizing hydrocarbons is disclosed. The process includes contacting, under reaction conditions, a hydrocarbon-containing fluid containing a saturated hydrocarbon, preferably a normal paraffin containing in the range of from about 4 carbon atoms to about 10 carbon atoms per molecule, with a composition in a single-stage reaction zone. The process includes isomerizing such saturated hydrocarbon to thereby provide a product containing an isomerized hydrocarbon. The composition used in the process contains a zeolite and a metal carbide. The composition can be produced by combining a metal, preferably such metal is in a metal compound, with the zeolite to thereby provide a metal-promoted zeolite. The metal-promoted zeolite is then calcined or steamed followed by contacting the resulting zeolite with a hydrocarbon, preferably in the presence of hydrogen, to thereby provide a carburized metal-promoted zeolite.

51 Claims, No Drawings

CATALYST COMPOSITION AND PROCESSES THEREFOR AND THEREWITH

BACKGROUND OF THE INVENTION

The invention relates to a process for isomerizing hydrocarbons, preferably normal paraffins, in the presence of a zeolite catalyst composition to isomerized hydrocarbons, preferably iso-paraffins.

The invention also relates to an improved method of making a zeolite catalyst composition having improved properties when compared with certain other zeolite catalyst compositions.

It is known that in a hydrotreating process for treating a hydrocarbon-containing fluid, such as catalytically cracked gasoline or gasoline range naphtha, the content of sulfur impurities is generally reduced thereby producing a hydrotreated product that can be commercially used. However, most commercial hydrotreating processes, contemporaneous with the reduction of sulfur content, also reduce the octane number of the hydrotreated product. Therefore, a second reforming/isomerization process is generally required to increase the octane number. Normal paraffins, also referred to as n-paraffins, are a major low-octane number contributor among the products of a hydrotreating process, e.g., among the products of hydrotreating catalytically cracked gasoline. However, conventional reforming/isomerization catalysts promoted by noble metals are unable to upgrade the n-paraffins of gasoline range naphtha due to the high sulfur environment.

It is therefore desirable to minimize the octane loss during the hydrotreating process by developing a catalyst which can be used subsequent to the hydrotreating process to enhance octane number. There is also a need to develop a catalyst which can be used to isomerize the n-paraffins in the product produced from such hydrotreating process, preferably the isomerization of n-hexane to iso-hexanes, i.e., $C_6$ isomers, such as dimethyl butanes (which includes 2,2-dimethyl butane and 2,3-dimethyl butane), methyl pentanes (which includes 2-methyl pentane and 3-methyl pentane), and the like and combinations thereof. Such development would also be a significant contribution to the art and to the economy.

SUMMARY OF THE INVENTION

It is an object of this invention to at least partially isomerize, i.e., convert, hydrocarbons, such as normal paraffins, from a hydrotreating process such as a catalytic cracked gasoline hydrotreating process, to isomerized hydrocarbons, such as iso-paraffins, utilizing an improved zeolite catalyst composition.

Another object of this invention is to provide a process for making an improved zeolite catalyst composition that has such desirable properties as providing for high isomerization capability when utilized in the conversion of hydrocarbons in hydrocarbon-containing fluid from a hydrotreating process.

Yet another object of this invention is to provide an isomerization process which can employ the improved zeolite catalyst composition.

A first embodiment of the invention provides a process for isomerizing hydrocarbons, wherein such process comprises contacting, under reaction conditions, a hydrocarbon-containing fluid comprising a saturated hydrocarbon, with a composition in a single-stage reaction zone. The inventive process includes isomerizing such saturated hydrocarbon to thereby provide a product comprising an isomerized hydrocarbon wherein such composition comprises a zeolite and a metal carbide.

A second embodiment of the invention is a process for producing a zeolite catalyst composition which can be used as a catalyst in a hydrocarbon conversion process, such as isomerizing the normal paraffins in the product of a hydrotreating process. The process can comprise: (1) optionally calcining a zeolite to produce a calcined zeolite; (2) contacting a zeolite or a calcined zeolite with a metal of Groups I to VIII of the CAS version of the Periodic Table of the Elements (CRC Handbook of Chemistry and Physics, 74th edition, 1993–1994, CRC Press, Boca Raton, Florida) under a condition sufficient to incorporate the metal into the zeolite to form a metal-promoted zeolite; (3) calcining the metal-promoted zeolite to produce a calcined metal-promoted zeolite or exposing the metal-promoted zeolite to a steam atmosphere to produce a steam-treated metal-promoted zeolite; and (4) contacting the metal-promoted zeolite with a hydrocarbon under a condition sufficient to convert the metal-promoted zeolite into a carburized metal-promoted zeolite.

Other objects and advantages of the invention will become more apparent from the detailed description and the appended claims.

DETAILED DESCRIPTION OF THE INVENTION

The inventive composition includes utilizing a zeolite having combined, or incorporated therein, a promoter which comprises a metal carbide wherein the metal of the metal carbide is selected from Groups I through VIII of the Periodic Table of the Elements such as, for example, tungsten, molybdenum, chromium, iron, ruthenium, manganese, rhenium, cobalt, rhodium, iridium, nickel, palladium, platinum, hafnium, titanium, zirconium, vanadium, niobium, tantalum, and combinations thereof. The promoter is present in the composition in an isomerizing amount to isomerize normal paraffin hydrocarbons when such composition is used to isomerize the normal paraffins contained in a hydrocarbon-containing fluid such as the product of a hydrotreating process, e.g., the hydrotreated product from the hydrotreating of catalytically cracked gasoline.

As used herein, the term "hydrocarbon" generally refers to, unless otherwise indicated, one or more hydrocarbons, saturated or unsaturated, having in the range of from about 1 carbon atom per molecule to about 50 carbon atoms per molecule, preferably in the range of from about 2 carbon atoms per molecule to about 40 carbon atoms per molecule, more preferably in the range of from about 2 carbon atoms per molecule to about 30 carbon atoms per molecule, and most preferably in the range from 2 carbon atoms per molecule to 20 carbon atoms per molecule. Preferably, a hydrocarbon is a saturated hydrocarbon, a mixture of saturated hydrocarbons, or a mixture of saturated hydrocarbons and unsaturated hydrocarbons. Examples of such hydrocarbons include, but are not limited to, methane, ethane, propane, butanes, pentanes, hexanes, gasolines, naphthas, fuel oils, and combinations of two or more thereof.

The weight ratio of the promoter, comprising metal carbide, to the zeolite can be any ratio so long as the ratio can effect the isomerization of normal paraffin hydrocarbons to iso-paraffin hydrocarbons in the isomerization of a hydrocarbon-containing fluid such as the product from a hydrotreating process, e.g., the hydrotreated product from the hydrotreating of catalytically cracked gasoline. Generally, the weight ratio of the metal carbide to the zeolite can be in the range of from about 0.0001:1 to about 1:1, preferably in the range of from about 0.0005:1 to about 1:1, more preferably in the range of from about 0.001:1 to about 0.9:1 and most preferably in the range from 0.005:1 to 0.75:1 for an effective isomerization of normal paraffin hydrocarbons to iso-paraffin hydrocarbons in the isomerization of a hydrocarbon-containing fluid such as the product from a hydrotreating process.

Alternatively, the promoter, comprising metal carbide, can be present in the zeolite catalyst composition, comprising a zeolite and promoter, in the range of from about 0.01 gram per 100 grams of the zeolite catalyst composition to about 50 grams per 100 grams of the zeolite catalyst composition, preferably in the range of from about 0.05 gram per 100 grams of the zeolite catalyst composition to about 50 grams per 100 grams of the zeolite catalyst composition, more preferably in the range of from about 0.1 gram per 100 grams of the zeolite catalyst composition to about 45 grams per 100 grams of the zeolite catalyst composition, and most preferably in the range from 0.5 gram per 100 grams of the zeolite catalyst composition to 40 grams per 100 grams of the zeolite catalyst composition.

The weight ratio of carbon to the metal of the metal carbide can be in the range of from about 0.01:1 to about 50:1, preferably in the range of from about 0.05:1 to about 30:1, more preferably in the range of from about 0.1:1 to about 20:1, and most preferably in the range of from 0.1:1 to 10:1.

According to the present invention, any promoter comprising metal carbide, that, as compared to use of a zeolite only, can effect the isomerization of normal paraffin hydrocarbons to iso-paraffin hydrocarbons in the isomerization of a hydrocarbon-containing fluid such as a product from a hydrotreating process, e.g., the hydrotreated product from the hydrotreating of catalytically cracked gasoline, can be employed. The metal of the metal carbide can be selected from Groups I through VIII of the Periodic Table of the Elements such as the group consisting of tungsten, molybdenum, chromium, iron, ruthenium, manganese, rhenium, cobalt, rhodium, iridium, nickel, palladium, platinum, hafnium, titanium, zirconium, vanadium, niobium, tantalum, and combinations thereof. The presently preferred metals are molybdenum and tungsten. The metal can be in any available oxidation state. For example, molybdenum and tungsten can have an oxidation state of 2, 3, 4, 5, or 6.

The composition can also be characterized by having the following physical characteristics: a micropore surface area, as determined by the BET method using nitrogen, in the range of from about 50 m$^2$/g to about 1000 m$^2$/g, preferably in the range of from about 50 m$^2$/g to about 500 m$^2$/g; a micropore pore volume in the range of from about 0.1 ml/g to about 2.0 ml/g, preferably in the range of from about 0.1 ml/g to about 1.0 ml/g; an average micropore pore diameter in the range of from about 0.1 Å to about 500 Å, preferably in the range of from about 1 Å to about 200 Å; and a porosity of more than about 20%.

Any commercially available zeolite can be employed in the invention. Examples of suitable zeolites include, but are not limited to, those disclosed in Kirk-Othmer Encyclopedia of Chemical Technology, third edition, volume 15, pages 638–669 (John Wiley & Sons, New York, 1981). Preferably, the zeolite has a constraint index (as defined in U.S. Pat. No. 4,097,367, which is incorporated herein by reference) in the range of from about 0.4 to about 12, preferably in the range of from about 2 to about 9. Generally, the molar ratio of $SiO_2$ to $Al_2O_3$ in the crystalline framework of the zeolite is at least about 5:1 and can range up to infinity. Preferably the molar ratio of $SiO_2$ to $Al_2O_3$ in the zeolite framework is in the range of from about 8:1 to about 200:1, more preferably in the range of from about 12:1 to about 100:1. Preferred zeolites include ZSM-5, ZSM-8, ZSM-11, ZSM-12, ZSM-35, ZSM-38, and combinations thereof. Some of these zeolites are also known as "MFI" or "Pentasil" zeolites. The presently preferred zeolite is a ZSM-5 zeolite.

Any method(s) known to one skilled in the art for incorporating a metal, metal compound, or a portion thereof into a zeolite such as, for example, impregnation, ion exchange, stirring, extrusion, or any physical mixing, can be employed for producing the composition of the present invention. However, it is presently preferred that the composition be produced by the inventive process described herein below.

According to the inventive process, a zeolite, preferably a ZSM-5 zeolite, can be optionally contacted with one or more suitable binders in a liquid, preferably aqueous medium, to form a zeolite-binder mixture. Any binders known to one skilled in the art for use with a zeolite are suitable for use herein. Examples of a suitable binder include, but are not limited to, clays such as, for example, kaolinite, halloysite, vermiculite, chlorite, attapulgite, smectite, montmorillonite, illite, saconite, sepiolite, palygorskite, and combinations of two or more thereof; diatomaceous earth; aluminas such as for example α-alumina and γ-alumina; silicas; alumina-silica; aluminum phosphate; aluminum chlorohydrate; and combinations of two or more thereof. Because these binders are well known to one skilled in the art, the description of which is omitted herein. The weight ratio of a zeolite to a binder can be in a wide range and generally in the range of from about 0.01:1 to about 200:1, preferably in the range of from about 0.1:1 to about 100:1.

The zeolite and the binder can be thoroughly mixed by any method(s) or means known to one skilled in the art such as stirring, blending, kneading, or extrusion, following which the zeolite-binder mixture can be dried in air at a temperature generally in the range of from about 20° C. to about 200° C., preferably in the range of from about 25° C. to about 175° C., and most preferably in the range of from 25° C. to 150° C. for a time period in the range of from about 0.5 hour to about 50 hours, preferably for a time period in the range of from about 1 hour to about 30 hours, and most preferably for a time period in the range of from 1 hour to 20 hours, preferably under atmospheric pressure. Thereafter, the dried, zeolite-binder mixture can be further calcined, if desired, under suitable calcining conditions.

Suitable calcining conditions include a temperature in the range of from about 250° C. to about 1,000° C., preferably in the range of from about 350° C. to about 750° C., and most preferably in the range from 400° C. to 650° C. and a pressure in the range of from about 7 pounds per square inch absolute (psia) to about 750 psia, preferably in the range of from about 7 psia to about 450 psia, and most preferably in the range from 7 psia to 150 psia for a time period in the range of from about 0.5 hour to about 30 hours, preferably in the range of from about 1 hour to about 20 hours, and most preferably in the range from 1.5 hours to 15 hours to prepare a calcined zeolite-binder. Preferably, the zeolite-binder is calcined in air. If a binder is not desired, a zeolite can also be calcined under similar conditions to remove any contaminants, if present.

A zeolite, a calcined zeolite, or a calcined zeolite-binder can be treated with a compound containing an exchangeable ammonium ion to prepare an ammonium-exchanged zeolite. Whether a zeolite is calcined or contains a binder, the inventive process is the same for each. For the interest of brevity, only a zeolite is described hereinbelow. Examples of suitable ammonium-containing compounds include, but are not limited to, ammonium sulfate, ammonium chloride, ammonium nitrate, ammonium bromide, ammonium fluoride, and combinations of any two or more thereof. Treatment of the zeolite replaces the original ions such as, for example, alkali or alkaline earth metal ions of the zeolite with predominantly ammonium ions. Techniques for such treatment are well known to one skilled in the art such as, for example, ion exchange with the original ions. For example, a zeolite can be contacted with a solution containing a salt of the desired replacing ion or ions.

Generally, a zeolite can be suspended in an aqueous solution of an ammonium-containing compound. The concentration of the zeolite in the aqueous solution can be in the range of from about 0.01 gram per liter to about 200 grams per liter, preferably in the range of from about 0.1 gram per liter to about 150 grams per liter, more preferably in the range of from about 1 gram per liter to about 100 grams per liter, and most preferably in the range of from 5 grams per liter to 75 grams per liter. The amount of the ammonium-containing compound required depends on the amount of the original ion(s) to be exchanged. Upon the preparation of the solution, the solution can be subjected to a temperature in the range of from about 30° C. to about 200° C., preferably in the range of from about 40° C. to about 150° C., and most preferably in the range of from 50° C. to 125° C. for a time period in the range of from about 1 hour to about 100 hours, preferably for a time period in the range of from about 1 hour to about 50 hours, and most preferably for a time period in the range of from 2 hours to 25 hours depending upon the desired degrees of ion exchange. The treatment can be carried out under a pressure in the range of from about atmospheric (i.e., about 14.7 psia) to about 150 psia, preferably about atmospheric or any pressure that can maintain the required temperature. Thereafter, the treated zeolite can be washed with running water for about 1 minute to about 60 minutes followed by drying and calcining to produce the calcined zeolite. The drying and calcining processes can be carried out substantially the same as those disclosed above for the preparation of a calcined zeolite or calcined zeolite-binder.

Generally, the ammonium-exchanged zeolite becomes hydrogen exchanged upon calcination or high temperature treatment such that a predominant proportion of its exchangeable cations are hydrogen ions. The above-described ion exchanges of exchangeable ions in a zeolite are well known to one skilled in the art. Because the ion exchange procedure is well known, the description of which is omitted herein for the interest of brevity.

According to the inventive process, a zeolite is generally first treated with a metal (a promoter precursor) to thereby provide a metal-promoted zeolite. Any metal, preferably a metal selected from Groups I through VIII of the Periodic Table of the Elements, which can be converted to its metal carbide and which can effect the isomerization of normal paraffin hydrocarbons to iso-paraffin hydrocarbons in the isomerization of a hydrocarbon-containing fluid such as the product from a hydrotreating process, e.g., the hydrotreated product from the hydrotreating of a catalytically cracked gasoline, can be employed.

Presently it is preferred that such metal be in a metal compound selected from the group consisting of tungsten compounds, molybdenum compounds, chromium compounds, iron compounds, ruthenium compounds, manganese compounds, rhenium compounds, cobalt compounds, rhodium compounds, iridium compounds, nickel compounds, palladium compounds, platinum compounds, hafnium compounds, titanium compounds, zirconium compounds, vanadium compounds, niobium compounds, tantalum compounds, and combinations of two or more thereof. The presently preferred metal compound is selected from the group consisting of tungsten compounds, molybdenum compounds, and combinations thereof.

Examples of suitable tungsten compounds include, but are not limited to, ammonium tungstate, tungsten chloride, tungsten oxides, tungstic acid, and combinations of two or more thereof. The presently preferred tungsten compound is ammonium tungstate.

Examples of suitable molybdenum compounds include, but are not limited to, molybdenum chloride, molybdenum acetate, molybdenum fluoride, molybdenum hexacarbonyl, molybdenum sulfide, sodium molybdates, potassium molybdates, molybdenum oxychloride, ammonium tetrathiomolybdate, ammonium molybdate, ammonium dimolybdate, ammonium heptamolybdate, molybdenum oxides, and combinations of two or more thereof. The presently preferred molybdenum compound is ammonium heptamolybdate.

Examples of suitable titanium compounds include, but are not limited to, titanium zinc titanate, titanium tetramides, titanium tetramercaptides, titanium tetrabutoxide, titanium tetramethoxides, titanium tetraethoxide, titanium tetrapropoxide, titanium tetrachloride, titanium trichloride, titanium bromides, and combinations of two or more thereof.

Examples of suitable zirconium compounds include, but are not limited to, zirconium acetate, zirconium formate, zirconium chloride, zirconium bromide, zirconium butoxide, zirconium tert-butoxide, zirconium citrate, zirconium ethoxide, zirconium methoxide, zirconium propoxide, and combinations of two or more thereof.

Examples of suitable vanadium compounds include, but are not limited to, vanadium bromide, vanadium chlorides, vanadium oxides, and combinations of two or more thereof.

Examples of suitable niobium compounds include, but are not limited to, niobium bromide, niobium chloride, niobium oxides, and combinations of two or more thereof.

Examples of suitable tantalum compounds include, but are not limited to, tantalum bromide, tantalum chloride, tantalum oxides, and combinations of two or more thereof.

Examples of the other metal compounds are well known to one skilled in the art, the description of which is omitted herein for the interest of brevity.

Generally, a zeolite, calcined zeolite, zeolite-binder, or calcined zeolite-binder, can be combined with a metal (a promoter precursor), preferably such metal is in a metal compound as described above, in any suitable weight ratios which result in the weight ratios of a metal carbide to a zeolite catalyst composition disclosed above in the first embodiment of the invention. The combination can be carried out by any method(s) or means known to one skilled in the art to provide a metal-promoted zeolite. For example, a metal, preferably a metal compound, can be physically mixed or blended with a zeolite by stirring, extrusion, blending, kneading, or combinations of two or more thereof. Also for example, a metal, preferably a metal compound, can be combined with a zeolite by extrusion or impregnation, such as by an incipient wetness impregnation technique (i.e., essentially completely filling the pores of the substrate material with a solution of the incorporating elements). Presently it is preferred that such combination of zeolite and a metal, preferably a metal compound, be carried out by physical mixing, incipient wetness impregnation technique, or in a suitable liquid, preferably an aqueous medium, to form an incipient wetness metal precursor-zeolite mixture or a metal-promoted zeolite. The combinations can be carried out at about 10° C. to about 120° C. for about 5 minutes to about 20 hours. The quantity of metal required is the quantity that can produce the composition disclosed above in the first embodiment of the invention.

Many of the possible mixing means suitable for use in preparing the mixture of zeolite and a metal, preferably a metal compound, are described in detail in *Perry's Chemical Engineers' Handbook, Sixth Edition*, published by McGraw-Hill, Inc., copyright 1984, at pages 21-3 through 21-10, which pages are incorporated herein by reference. Thus, suitable mixing means can include, but are not limited to, such devices as tumblers, stationary shells or troughs, Muller mixers, which are either batch type or continuous type, impact mixers, and the like.

It can be desirable to form an agglomerate of the mixture of zeolite and a metal, preferably a metal compound. Any suitable means known by those skilled in the art for forming such an agglomerate can be used. Such methods include, for example, molding, tableting, pressing, pelletizing, extruding, tumbling, and densifying. Further discussion of such methods is provided in a section entitled "Size Enlargement" in *Perry's Chemical Engineers' Handbook, Sixth Edition*, published by McGraw-Hill, Inc., copyright 1984, at pages 8-60 through 8-72, which pages are incorporated herein by reference.

Generally, the mixture of zeolite and a metal, preferably a metal compound, is compounded and subsequently shaped (such as by pelletizing, extruding or tableting) into a compounded composition. Generally, the surface area of the compounded composition is in the range of from about 50 $m^2/g$ to about 1000 $m^2/g$. Generally, the particle size of the compounded composition is in the range of from about 1 mm to about 10 mm.

It can then be desirable to subject the metal-promoted zeolite to a thermal treatment in hot air, i.e., calcination, or steam. Preferably, the metal-promoted zeolite is subjected to calcination under suitable calcining conditions. Suitable calcining conditions include a temperature in the range of from about 250° C. to about 1,000° C., preferably in the range of from about 350° C. to about 750° C., and most preferably in the range of from 400° C. to 650° C. and a pressure in the range of from about 7 pounds per square inch absolute (psia) to about 750 psia, preferably in the range of from about 7 psia to about 450 psia, and most preferably in the range of from 7 psia to 150 psia for a time period in the range of from about 0.5 hour to about 30 hours, preferably in the range of from about 1 hour to about 20 hours, and most preferably in the range of from 1.5 hours to 15 hours. Preferably, the metal-promoted zeolite is calcined in air.

The metal-promoted-zeolite can also be subjected to a steam treatment whereby it is exposed by any suitable means or method(s) known in the art to an atmosphere of steam under process conditions that suitably provide a steam-treated metal-promoted zeolite. The zeolite is exposed to a predominantly gaseous atmosphere, preferably an entirely gaseous atmosphere, comprising steam and also inert gas(es) such as helium. The steam atmosphere preferably has a concentration of steam, less any inert gas(es), exceeding about 90 molar percent and, most preferably, the concentration of steam, less any inert gas(es), exceeds about 95 molar percent. Preferably, the steam is superheated and not saturated.

The steam treatment can be conducted at any pressure and temperature conditions that suitably provide the steam-treated metal-promoted zeolite. Generally, the steam treatment can be conducted at a pressure in the range of from below atmospheric upwardly to about 1000 pounds per square inch absolute (psia). More typical pressures, however, are in the range of from about atmospheric to about 500 psia. The steam treatment temperature is generally in the range of from about 100° C. to about 1000° C. Preferably, the steam treatment temperature is in the range of from about 450° C. to about 975° C., more preferably, the steam treatment temperature is in the range of from about 475° C. to about 950° C. and, most preferably, the steam treatment temperature is in the range of from 500° C. to 925° C.

Generally, the time period for exposing the metal-promoted zeolite to the atmosphere of steam at appropriate temperature conditions can be in the range of from about 0.1 hour to about 30 hours. Preferably, the steam treatment step is conducted for a time period in the range of from about 0.25 hour to about 25 hours and, most preferably, in the range of from 0.5 hour to 20 hours.

Thereafter, the metal-promoted zeolite (zeolite and metal), preferably calcined metal-promoted zeolite, is contacted with an aliphatic or aromatic hydrocarbon under a condition sufficient to incorporate carbon into the metal-promoted zeolite to produce a carburized metal-promoted zeolite. Generally any aliphatic hydrocarbon, straight-chained hydrocarbon, or branch-chained hydrocarbon can be used. Similarly, any aromatic hydrocarbon, non-substituted or substituted, can also be used. However, it is preferred that the hydrocarbon has in the range of from about 1 carbon atom per molecule to about 20 carbon atoms per molecule, preferably in the range of from about 1 carbon atom per molecule to about 15 carbon atoms per molecule, and most preferably in the range of from 1 carbon atom per molecule to 10 carbon atoms per molecule. Examples of a suitable hydrocarbon include, but are not limited to, methane, ethane, propane, butanes, isobutane, pentanes, hexanes, heptanes, octanes, nonanes, benzene, toluene, or combinations of two or more thereof. The presently preferred hydrocarbon is methane. The quantity of hydrocarbon required is the quantity that can result in the composition disclosed above in the first embodiment of the invention. The quantity of carbon incorporated can be determined by any means known to one skilled in the art such as, for example, thermal gravimetric analysis.

The contacting conditions for contacting the metal-promoted zeolite with an aliphatic or aromatic hydrocarbon can include a temperature in the range of from about 150° C. to about 1500° C., preferably in the range of from about 200° C. to about 1200° C., and most preferably in the range of from 275° C. to 1000° C., under a pressure that can accommodate the temperature ranges, preferably about atmospheric pressure (i.e., about 14.7 pounds per square inch) and for a time period in the range of from about 1 hour to about 20 hours, preferably in the range of from about 2 hours to about 15 hours, and most preferably in the range of from 3 hours to 10 hours.

Preferably, the contacting is carried out in the presence of a gas that is inert to the contacting of the metal-promoted zeolite and hydrocarbon, such as hydrogen, helium, argon, nitrogen, and combinations thereof. The presently preferred inert gas is hydrogen at a flow in the range of from about 0.1 gram of hydrogen per gram of the metal-promoted zeolite to about 10,000 grams of hydrogen per gram of the metal-promoted zeolite, preferably at a flow in the range of from about 1 gram of hydrogen per gram of the metal-promoted zeolite to about 1000 grams of hydrogen per gram of the metal-promoted zeolite.

Contacting the metal-promoted zeolite with an aliphatic or aromatic hydrocarbon under a condition sufficient to incorporate carbon into the metal-promoted zeolite to produce a carburized metal-promoted zeolite, i.e., zeolite and promoter comprising metal carbide, can be referred to as carburizing or carburization. Upon completion of incorporating or impregnating the carbon into the zeolite by thermal treatment, a carburized metal-promoted zeolite, i.e., zeolite and promoter comprising metal carbide, is formed.

It can then be desirable to subject the carburized metal-promoted zeolite to a thermal treatment in hot air, i.e., calcination, or steam, under the conditions described above for thermal treatment of the metal-promoted zeolite.

The composition of the invention can then be, if desired, pretreated with a reducing agent before being used in the inventive hydrocarbon conversion process. The presently preferred reducing agent is a hydrogen-containing fluid which comprises molecular hydrogen ($H_2$) in the range of from about 1 volume % to about 100 volume %, preferably in the range of from about 5 volume % to about 100 volume %, and most preferably in the range of from 10 volume % to 100 volume %. The reduction can be carried out at a temperature in the range of from about 250° C. to about 800° C., preferably in the range of from about 300° C. to about 700° C., and most preferably in the range of from 350° C. to 650° C. for a time period in the range of from about 0.1 hour to about 10 hours, preferably in the range of from about 0.5 hour to about 7 hours, and most preferably in the range of from 1 hour to 5 hours.

The inventive process comprises contacting a hydrocarbon-containing fluid comprising a saturated hydrocarbon with a catalyst composition described above under suitable process conditions sufficient to effect the isomerization of such saturated hydrocarbon to thereby provide a product comprising an isomerized hydrocarbon. Preferably, such saturated hydrocarbon comprises a normal paraffin (n-paraffin) hydrocarbon containing in the range of from about 4 carbon atoms to about 10 carbon atoms per molecule. Non-limiting examples of suitable normal paraffin hydrocarbons include, but are not limited to, n-butane, n-pentane, n-hexane, n-heptane, octanes, nonanes, decanes, and the like and mixtures thereof. More preferably, such normal paraffin is normal hexane (n-hexane).

Preferably, such isomerized hydrocarbon comprises an iso-paraffin hydrocarbon containing in the range of from about 4 carbon atoms to about 10 carbon atoms per molecule. More preferably, such iso-paraffin is an iso-hexane, i.e., a $C_6$ isomer, selected from the group consisting of dimethyl butanes (which includes 2,2-dimethyl butane and 2,3-dimethyl butane), methyl pentanes (which includes 2-methyl pentane and 3-methyl pentane), and the like and combinations thereof. Such hydrocarbon-containing fluid can further comprise paraffins, olefins, naphthas, naphthenes, or combinations of two or more thereof. The term "fluid" is used herein to denote gas, liquid, vapor, or combinations thereof.

Any hydrocarbon-containing fluid which contains a saturated hydrocarbon can be used in the process of this invention. Generally, the hydrocarbon-containing fluid can also contain olefins, naphthenes (cycloalkanes), and/or some aromatic compounds. Examples of a suitable, available hydrocarbon-containing fluid include, but are not limited to, catalytically cracked gasolines, pyrolysis gasolines from thermal cracking of saturated hydrocarbons, coker naphthas produced by the coking of residual charge stocks, naphthas, gas oils, reformates, fuel oils, and combinations thereof. A preferred hydrocarbon-containing fluid is a hydrotreated hydrocarbon-containing fluid such as the product derived from the hydrotreating of catalytically cracked gasoline, e.g., the effluent from a catalytic hydrotreater.

Generally, such hydrocarbon-containing fluid is hydrodenitrogenated and hydrodesulfurized. Such hydrocarbon-containing fluid typically contains organonitrogen compounds in a concentration, calculated as N, in the range of from about 0.01 part N per million parts hydrocarbon-containing fluid (ppm N) to about 40 ppm N, preferably in the range of from about 0.05 ppm N to about 10 ppm N, and most preferably in the range of from 0.1 ppm N to 5 ppm N.

Such hydrocarbon-containing fluid typically contains organosulfur compounds in a concentration, calculated as S, in the range of from about 0.01 part S per million parts hydrocarbon-containing fluid (ppm S) to about 5000 ppm S, preferably in the range of from about 0.05 ppm S to about 500 ppm S, and most preferably in the range of from 0.1 ppm S to 250 ppm S. Although the inventive zeolite catalyst composition is active for isomerization in the presence of sulfur in the hydrocarbon-containing fluid, such activity is better when there is less than about 500 ppm sulfur, preferably less than about 250 ppm sulfur, in the hydrocarbon-containing fluid.

The hydrocarbon-containing fluid can be contacted by any suitable manner with the inventive zeolite catalyst composition described herein which is contained within a reaction zone, preferably within a single-stage reaction zone. The reaction zone, preferably single-stage reaction zone, is defined by a structure comprising an inlet, an outlet, and a length-to-diameter ratio (L:D ratio) preferably in the range of from about 1:1 to about 30:1, more preferably in the range of from about 2:1 to about 20:1, and, most preferably, in the range of from 3:1 to 10:1. Such structure can comprise, for example, a reactor vessel.

The contacting step, of contacting the hydrocarbon-containing fluid with the inventive zeolite catalyst composition, can be operated as a batch process step or, preferably, as a continuous process step. In the latter operation, a solid catalyst bed or a moving catalyst bed or a fluidized catalyst bed can be employed. Any of these operational modes have advantages and disadvantages, and those skilled in the art can select the one most suitable for a particular fluid and catalyst.

The contacting step is preferably carried out within a reaction zone, wherein is contained the novel zeolite catalyst composition, and under reaction conditions that suitably promote the isomerization of at least a portion of the hydrocarbons of the hydrocarbon-containing fluid. The reaction temperature of the contacting step is more particularly in the range of from about 200° C. to about 800° C., preferably, in the range of from about 250° C. to about 750° C. and, most preferably, in the range of from 300° C. to 700° C. The reaction pressure can be in the range of from below atmospheric pressure upwardly to about 1500 pounds per square inch absolute (psia), preferably, in the range of from about atmospheric to about 1000 psia and, most preferably, in the range of from 20 psia to 750 psia.

The flow rate at which the hydrocarbon-containing fluid is charged to the reaction zone (i.e., the charge rate of the hydrocarbon-containing fluid) is such as to provide a weight hourly space velocity ("WHSV") in the range of from exceeding 0 hour$^{-1}$ upwardly to about 1000 hour$^{-1}$. The term "weight hourly space velocity", as used herein, shall mean the numerical ratio of the rate at which a hydrocarbon-containing fluid is charged to a reaction zone in pounds per hour divided by the pounds of catalyst contained in the reaction zone to which the hydrocarbon-containing fluid is charged. The preferred WHSV of the feed to the reaction zone can be in the range of from about 0.25 hour$^{-1}$ to about 250 hour$^{-1}$ and, most preferably, in the range from 0.5 hour$^{-1}$ to 100 hour$^{-1}$.

The reaction effluent generally has a reduced normal paraffins content when compared to the hydrocarbon-containing fluid feed stream. The process effluent can be recovered and processed by any method(s) or means known to one skilled in the art.

After the zeolite catalyst composition has been deactivated by, for example, coke deposition or feed poisons, to an extent that the conversion of hydrocarbons, more particularly, the conversion of normal paraffin hydrocarbons to iso-paraffin hydrocarbons, has become unsatisfactory, the zeolite catalyst composition can be reactivated by any means or method(s) known to one skilled in the art such as, for example, calcining in air to burn off deposited coke and other carbonaceous materials, such as oligomers or polymers, preferably at a temperature in the range of from about 400° C. to about 1000° C. The optimal time periods of the calcining depend generally on the types and amounts of deactivating deposits on the catalyst composition and on the calcination temperatures. These optimal time periods can easily be determined by those possessing ordinary skills in the art and are omitted herein for the interest of brevity.

The following examples are presented to further illustrate this invention and are not to be construed as unduly limiting the scope of this invention.

EXAMPLE I

This example illustrates the preparation of several hydrocarbon conversion catalysts comprising ZSM-5 zeolite which can be used in the isomerization of hydrocarbons in a hydrocarbon-containing fluid.

Catalyst A (Control)

A commercially available ZSM-5 zeolite catalyst provided by United Catalysts, Inc., Louisville, Kentucky, having a product designation of "T-4480" obtained as 1/16 extrudate and alumina-bound (about 30 weight % alumina) was washed with running water for about 30 minutes and then dried in air at room temperature (about 20° C. to about 25° C.) and at atmospheric pressure (about 14.7 pounds per square inch absolute) for about 1 to 2 hours. The thus dried zeolite was then calcined in air for about 2 to 3 hours at 538° C.

Catalyst B (Control)

A 46 gram quantity of the above-described Catalyst A was impregnated, by an incipient wetness impregnation technique (i.e., essentially completely filling the pores of the substrate material with a solution of the incorporating elements), with 31.7 grams of 20 weight % $(NH_4)_4H_2W_{12}O_{40}$ solution followed by calcining in air at 538° C. for 6 hours to produce 47.7 grams of tungsten-promoted (W-promoted) ZSM-5. The tungsten-promoted ZSM-5 contained a tungsten concentration of 9.9 weight percent of the final product.

Catalyst C (Invention)

A 26.9 gram quantity of the above-described Catalyst B was heated with a gas mixture of methane (150 ml/min) and hydrogen (600 m/min). The heating was carried out by raising the temperature from room temperature (about 20° C. to 25° C.) to 400° C. over a time period of about 0.25 hour followed by ramping at 1° C./minute to 760° C. Due to the exothermic nature of the process, a final temperature of 788° C. was reached and then maintained at 788° C. for about 2 hours. The thus carburized tungsten-promoted ZSM-5, i.e., ZSM-5 and promoter comprising tungsten carbide, was then cooled in a hydrogen stream (600 ml/min) for about 2 hours to produce 26.2 grams of carburized tungsten-promoted ZSM-5.

Catalyst D (Control)

A 23.5 gram quantity of the above-described Catalyst A was impregnated, by an incipient wetness impregnation technique (i.e., essentially completely filling the pores of the substrate material with a solution of the incorporating elements), with 16.1 grams of an aqueous solution containing 20 weight percent $(NH_4)_6Mo_7O_{24}\cdot 4H_2O$ followed by calcining in air at 538° C. for 6 hours to produce 25.1 grams of molybdenum-promoted (Mo-promoted) ZSM-5. The molybdenum-promoted ZSM-5 contained a molybdenum concentration of 7.0 weight percent of the final product.

Catalyst E (Invention)

A 23.2 gram quantity of the above-described Catalyst D was heated with a gas mixture of methane (150 ml/min) and hydrogen (600 ml/min). The heating was carried out by raising the temperature from room temperature (about 20° C. to 25° C.) to 400° C. over a time period of about 0.25 hour followed by ramping at 0.5° C./minute to 710° C. and then maintained at 710° C. for about 2 hours to produce 21.3 grams of carburized molybdenum-promoted ZSM-5, i.e., ZSM-5 and promoter comprising molybdenum carbide.

EXAMPLE II

This example illustrates the use of the compositions described in Example I as catalysts in the conversion of normal hexane, contained in the product derived from hydrotreating catalytically cracked gasoline, to iso-hexanes.

A stainless steel reactor tube (inner diameter: 2.5 cm; length: 60 cm) was filled with a 20 ml bottom layer of Alundum® alumina (inert, low surface alumina, Norton Company, Worcester, Mass.), 3.1 grams to 3.4 grams of one of the catalysts of Example I in the middle, and a 20 ml top layer of Alundum® alumina. The reactor was heated to a process temperature of about 320° C. to about 325° C. The feed was a product derived from the hydrotreating of catalytically cracked gasoline (CCG) obtained from a Phillips Petroleum Company refinery and contained about 85 weight percent normal hexane, about 4 weight percent $C_6$ non-aromatic hydrocarbons, and about 11 weight percent methyl cyclopentane. The feed was introduced at a rate of about 20 ml/hour (equivalent to a weight hourly space velocity of about 3.9 to about 4.1 hour$^{-1}$). The process pressure was about 500 pounds per square inch gauge (psig).

The reactor effluent was cooled and separated into a gaseous phase and a liquid phase by passing it through a wet ice trap for liquid product collection and then through a wet test meter for gas volume measurement. The liquid was weighed hourly and analyzed on a Hewlett-Packard 5890 gas chromatograph equipped with a fused silica column (DB-1). The gas was sampled hourly and analyzed on a Hewlett-Packard 5890 gas chromatograph using a HP-PLOT/$Al_2O_3$ column. The gas was also analyzed for hydrogen content on a Carle gas chromatograph using a hydrocarbon trap followed by a 13× molecular sieve column. Pertinent test results after run times of about 6 to 7 hours are summarized in Table I.

TABLE I

| Catalyst | Composition of Liquid Product (Wt-%) | | | | | | | | n-C$_6$ Conversion (Wt-%) | Isomerization Selectivity[6] (%) | Aromatics Selectivity[7] (%) |
| --- | --- | --- | --- | --- | --- | --- | --- | --- | --- | --- | --- |
| | ΣC$_5$ | ΣDMB[1] | ΣMP[2] | n-C$_6$[3] | Nonaromatics[4] | BTX[5] | C$_9$+ | ΣC$_5$+ | | | |
| A zeolite | 1.5 | 0.2 | 2.8 | 8.9 | 6.4 | 0.5 | 0.1 | 20.4 | 89.5 | 3.4 | 0.5 |
| B tungsten-promoted zeolite | 0.9 | 0.1 | 1.5 | 3.1 | 4.1 | 0.4 | 0.2 | 10.2 | 96.4 | 1.7 | 0.4 |
| C carburized tungsten-promoted zeolite | 0.4 | 0.7 | 8.9 | 43.5 | 4.4 | 0.3 | 0.0 | 58.1 | 48.9 | 19.5 | 0.6 |
| D molybdenum-promoted zeolite | 0.6 | 0.7 | 8.2 | 41.2 | 4.7 | 0.2 | 0.0 | 55.6 | 51.5 | 17.3 | 0.4 |
| E carburized molybdenum-promoted zeolite | 0.1 | 0.7 | 11.4 | 44.1 | 6.1 | 0.0 | 0.0 | 62.3 | 48.1 | 25.0 | 0.0 |

[1]Dimethyl butanes (includes 2,2-dimethyl butane and 2,3-dimethyl butane)
[2]Methyl pentanes (inclues 2-methyl pentane and 3-methyl pentane)
[3]Normal hexane
[4]Includes C$_7$–C$_8$ nonaromatics
[5]Includes benzene, toluene, xylene, and minor amounts of ethylbenzene
[6]Determined by dividing the weight percentage of C$_6$ isomers (ΣDMB + ΣMP) in the product by the n-C$_6$ conversion
[7]Determined by dividing the weight percentage of BTX in the product by the n-C$_6$ conversion Test data in Table I clearly show that Invention Catalyst C, which had been promoted with a tungsten component and then carburized, exhibited a significantly higher isomerization selectivity than Control Catalyst A, which had not been promoted with a tungsten component nor carburized, and Control Catalyst B which was promoted with a tungsten component but had not been carburized. Invention Catalyst C isomerized normal hexane to significantly higher amounts of dimethyl butanes and methyl pentanes than Control Catalysts A and B. The performance of Invention Catalyst C, as compared to Control Catalysts A and B, is superior when comparing the isomerization selectivity. The improvement in catalyst performance is believed to be due to the novel process of making the inventive catalyst by the novel process of promoting a zeolite with a tungsten component to produce a tungsten-promoted zeolite followed by carburizing such tungsten-promoted zeolite to produce a carburized tungsten-promoted zeolite, i.e., zeolite and promoter comprising tungsten carbide.

Test data in Table I also clearly show that Invention Catalyst E, which had been promoted with a molybdenum component and then carburized, exhibited a significantly higher isomerization selectivity than Control Catalyst A, which had not been promoted with a molybdenum component nor carburized, and Control Catalyst D which was promoted with a molybdenum component but had not been carburized. Invention Catalyst E isomerized normal hexane to significantly higher amounts of dimethyl butanes and methyl pentanes than Control Catalysts A and D. The performance of Invention Catalyst E, as compared to Control Catalysts A and D, is superior when comparing the isomerization selectivity. The improvement in catalyst performance is believed to be due to the novel process of making the inventive catalyst by the novel process of promoting a zeolite with a molybdenum component to produce a molybdenum-promoted zeolite followed by carburizing such molybdenum-promoted zeolite to produce a carburized molybdenum-promoted zeolite.

The difference in performance between the invention catalysts and the control catalysts is certainly unexpected. One would not expect that promoting a zeolite with a tungsten component or a molybdenum component followed by carburization in lieu of no carburization or not promoting such zeolite with tungsten or molybdenum, would enhance the performance of the final zeolite catalyst composition. The results demonstrate that the Invention Catalysts, in which a zeolite is promoted with a tungsten component or a molybdenum component, followed by carburization, as opposed to no carburization or not promoting with an element such as tungsten or molybdenum, gives a catalyst that is significantly superior to the Control Catalysts.

The results shown in the above examples clearly demonstrate that the present invention is well adapted to carry out the objects and attain the ends and advantages mentioned as well as those inherent therein.

Reasonable variations, modifications, and adaptations can be made within the scope of the disclosure and the appended claims without departing from the scope of this invention.

What is claimed is:

1. A process for isomerizing hydrocarbons, wherein said process comprises contacting, under reaction conditions, a hydrocarbon-containing fluid comprising a saturated hydrocarbon, with a composition in a single-stage reaction zone, and isomerizing said saturated hydrocarbon to thereby provide a product comprising an isomerized hydrocarbon, wherein said composition co lists essentially of a zeolite and a metal carbide and further wherein said metal carbide has not been subjected to calcination.

2. A process according to claim 1 wherein the weight ratio of said metal carbide to said zeolite is in the range of from about 0.0001:1 to about 1:1.

3. A process according to claim 2 wherein said metal carbide is present in said composition in the range of from about 0.01 gram per 100 grams of said composition to about 50 grams per 100 grams of said composition.

4. A process according to claim 3 wherein the weight ratio of carbon to the metal of said metal carbide is in the range of from about 0.01:1 to about 50:1.

5. A process according to claim 4 wherein the metal of said metal carbide is selected from the group consisting of tungsten, molybdenum, chromium, iron, ruthenium, manganese, rhenium, cobalt, rhodium, iridium, nickel, palladium, platinum, hafnium, titanium, zirconium, vanadium, niobium, tantalum, and combinations thereof.

6. A process according to claim 5 wherein said metal of said metal carbide is tungsten.

7. A process according to claim 5 wherein said metal of said metal carbide is molybdenum.

8. A process according to claim 1 wherein said saturated hydrocarbon comprises a normal paraffin containing in the range of from about 4 carbon atoms to about 10 carbon atoms per molecule.

9. A process according to claim 8 wherein said normal paraffin is normal hexane.

10. A process according to claim 9 wherein said isomerized hydrocarbon comprises an iso-paraffin containing in the range of from about 4 carbon atoms to about 10 carbon atoms per molecule.

11. A process according to claim 10 wherein said iso-paraffin is an iso-hexane selected from the group consisting of dimethyl butanes, methyl pentanes, and combinations thereof.

12. A process according to claim 11 wherein said hydrocarbon-containing fluid is selected from the group consisting of catalytically cracked gasolines, pyrolysis gasolines from thermal cracking of saturated hydrocarbons, coker naphthas produced by the coking of residual charge stocks, naphthas, gas oils, reformates, fuel oils, and combinations thereof.

13. A process according to claim 12 wherein said hydrocarbon-containing fluid comprises a hydrotreated hydrocarbon-containing fluid.

14. A process according to claim 13 wherein said hydrotreated hydrocarbon-containing fluid is a product derived from the hydrotreating of catalytically cracked gasoline.

15. A process according to claim 1 wherein said hydrocarbon-containing fluid contains in the range of from about 0.01 part N per million parts said hydrocarbon-containing fluid (about 0.01 ppm N) to about 40 ppm N.

16. A process according to claim 1 wherein said hydrocarbon-containing fluid contains in the range of from about 0.01 part S per million parts said hydrocarbon-containing fluid (about 0.01 ppm S) to about 5000 ppm S.

17. A process according to claim 1 wherein said single-stage reaction zone comprises a structure comprising an inlet, an outlet, and a length-to-diameter ratio (L:D ratio) preferably in the range of from about 1:1 to about 30:1.

18. A process according to claim 17 wherein said single-stage reaction zone is a reactor vessel.

19. A process according to claim 18 wherein said reaction conditions comprise:
   a temperature in the range of from about 200° C. to about 800° C.,
   a pressure in the range of from below atmospheric pressure upwardly to about 1500 pounds per square inch absolute (psia), and
   a charge rate of said hydrocarbon-containing fluid such that the weight hourly space velocity is in the range of from exceeding 0 hour$^{-1}$ upwardly to about 1000 hour$^{-1}$.

20. A process according to claim 1 wherein said zeolite is selected from the group consisting of ZSM-5, ZSM-8, ZSM-11, ZSM-12, ZSM-35, ZSM-38, and combinations thereof.

21. A process according to claim 20 wherein said zeolite is a ZSM-5 zeolite.

22. A process for isomerizing hydrocarbons, wherein said process comprises contacting, under reaction conditions, a hydrocarbon-containing fluid comprising a saturated hydrocarbon, with a composition in a single-stage reaction zone, and isomerizing said saturated hydrocarbon to thereby provide a product comprising an isomerized hydrocarbon, wherein said composition is prepared by a process consisting essentially of:
   (a) combining a zeolite with a metal to thereby provide a metal-promoted zeolite,
   (b) calcining said metal-promoted zeolite under calcining conditions to thereby provide a calcined metal-promoted zeolite, and
   (c) contacting said calcined metal-promoted zeolite with a hydrocarbon under contacting conditions sufficient to thereby provide a carburized metal-promoted zeolite.

23. A process according to claim 22 wherein said metal is in a metal compound selected from the group consisting of tungsten compounds, molybdenum compounds, chromium compounds, iron compounds, ruthenium compounds, manganese compounds, rhenium compounds, cobalt compounds, rhodium compounds, iridium compounds, nickel compounds, palladium compounds, platinum compounds, hafnium compounds, titanium compounds, zirconium compounds, vanadium compounds, niobium compounds, tantalum compounds, and combinations thereof.

24. A process according to claim 23 wherein said contacting in step (c) is carried out in the presence of hydrogen.

25. A process according to claim 24 wherein said metal compound comprises a tungsten compound.

26. A process according to claim 25 wherein said tungsten compound is selected from the group consisting of ammonium tungstate, tungsten chloride, tungsten oxides, tungstic acid, and combinations thereof.

27. A process according to claim 26 wherein said tungsten compound is ammonium tungstate.

28. A process according to claim 24 wherein said metal compound comprises a molybdenum compound.

29. A process according to claim 28 wherein said molybdenum compound is selected from the group consisting of molybdenum chloride, molybdenum acetate, molybdenum fluoride, molybdenum hexacarbonyl, molybdenum sulfide, sodium molybdates, potassium molybdates, molybdenum oxychloride, ammonium tetrathiomolybdate, ammonium molybdate, ammonium dimolybdate, ammonium heptamolybdate, molybdenum oxides, and combinations thereof.

30. A process according to claim 29 wherein said molybdenum compound is ammonium heptamolybdate.

31. A process according to claim 22 wherein said zeolite is selected from the group consisting of ZSM-5, ZSM-8, ZSM-11, ZSM-12, ZSM-35, ZSM-38, and combinations thereof.

32. A process according to claim 31 wherein said zeolite is a ZSM-5 zeolite.

33. A process according to claim 22 wherein said zeolite in said combining step (a) is contacted with a binder before said combining said zeolite with said metal.

34. A process according to claim 22 wherein said calcining conditions in said calcining step (b) comprise:
   a temperature in the range of from about 250° C. to about 1,000° C.,
   a pressure in the range of from about 7 pounds per square inch absolute (psia) to about 750 psia, and
   a time period in the range of from about 0.5 hour to about 30 hours.

35. A process according to claim 34 wherein said metal-promoted zeolite is calcined in air.

36. A process according to claim 22 wherein said hydrocarbon in said contacting step (c) has in the range of from about 1 carbon atom per molecule to about 20 carbon atoms per molecule.

37. A process according to claim 36 wherein said hydrocarbon in said contacting step (c) is selected from the group consisting of methane, ethane, propane, butanes, isobutane, pentanes, hexanes, heptanes, octanes, nonanes, benzene, toluene, or combinations thereof.

38. A process according to claim 37 wherein said hydrocarbon in said contacting step (c) is methane.

39. A process according to claim 38 wherein said contacting conditions in said contacting step (c) comprise:

a temperature in the range of from about 150° C. to about 1,500° C., a pressure of about 14.7 pounds per square inch absolute (psia), and a time period in the range of from about 1 hour to about 20 hours.

40. A process according to claim 22 wherein said saturated hydrocarbon comprises a normal paraffin containing in the range of from about 4 carbon atoms to about 10 carbon atoms per molecule.

41. A process according to claim 40 wherein said normal paraffin is normal hexane.

42. A process according to claim 41 wherein said isomerized hydrocarbon comprises an iso-paraffin containing in the range of from about 4 carbon atoms to about 10 carbon atoms per molecule.

43. A process according to claim 42 wherein said iso-paraffin is an iso-hexane selected from the group consisting of dimethyl butanes, methyl pentanes and combinations thereof.

44. A process according to claim 43 wherein said hydrocarbon-containing fluid is selected from the group consisting of catalytically cracked gasolines, pyrolysis gasolines from thermal cracking of saturated hydrocarbons, coker naphthas produced by the coking of residual charge stocks, naphthas, gas oils, reformates, fuel oils, and combinations thereof.

45. A process according to claim 44 wherein said hydrocarbon-containing fluid comprises a hydrotreated hydrocarbon-containing fluid.

46. A process according to claim 45 wherein said hydrocarbon-containing fluid is a product derived from the hydrotreating of catalytically cracked gasoline.

47. A process according to claim 22 wherein said hydrocarbon-containing fluid contains in the range of from about 0.01 part N per million parts said hydrocarbon-containing fluid (about 0.01 ppm N) to about 40 ppm N.

48. A process according to claim 22 wherein said hydrocarbon-containing fluid contains in the range of from about 0.01 part S per million parts said hydrocarbon-containing fluid (about 0.01 ppm S) to about 5000 ppm S.

49. A process according to claim 22 wherein said single-stage reaction zone comprises a structure comprising an inlet, an outlet, and a length-to-diameter ratio (L:D ratio) in the range of from about 1:1 to about 30:1.

50. A process according to claim 49 wherein said single-stage reaction zone is a reactor vessel.

51. A process according to claim 50 wherein said reaction conditions comprise:

a temperature in the range of from about 200° C. to about 800° C., a pressure in the range of from below atmospheric pressure upwardly to about 1500 pounds per square inch absolute (psia), and a charge rate of said hydrocarbon-containing fluid such that the weight hourly space velocity is in the range of from exceeding 0 hour$^{-1}$ upwardly to about 1000 hour$^{-1}$.

* * * * *

UNITED STATES PATENT AND TRADEMARK OFFICE
CERTIFICATE OF CORRECTION

PATENT NO. : 6,124,516
DATED : September 26, 2000
INVENTOR(S) : An-hsiang Wu and Charles A. Drake It is certified that error appears in the above-identified patent and that said Letters Patent is hereby corrected as shown below:

Column 14, line 47, delete "co lists" and insert therefor ---consists---.
Column 15, line 42, delete "preferably".

Signed and Sealed this

Fifteenth Day of May, 2001

Attest:

NICHOLAS P. GODICI

Attesting Officer

Acting Director of the United States Patent and Trademark Office